3,570,149
COATED SHOE
Herbert Kogert and Johann Schwab, Vienna, Austria, assignors to Semperit Osterreichisch-Amerikanische Gummiwerke Aktiengesellschaft, Vienna, Austria
No Drawing. Filed Sept. 23, 1968, Ser. No. 761,854
Claims priority, application Austria, Sept. 22, 1967,
A 8,658/67
Int. Cl. A43b 00/00
U.S. Cl. 36—2.5                                           3 Claims

ABSTRACT OF THE DISCLOSURE

The present invention relates to a shoe whose upper consists of one or more textile layers (possibly coated with rubber or plastics) and of a sole joined to the upper, the whole shoe being coated with a cohesive polyurethane layer which has substantially the same thickness over the whole of the outside of the shoe. The shoe is preferably provided internally with cushion inserts. The polyurethane can be applied to the manufactured shoe by injection moulding, spraying, dipping or painting. Before application of the hot polyurethane, the cushioning material is preferably preheated and/or coated with skiver or synthetic leather.

BACKGROUND OF THE INVENTION

Shoes for skiing, mountaineering and industrial and other purposes are already known, the uppers of which are formed from a plurality of rubber layers of varying stiffness separated from one another by layers of material. An outer sole is fixed to such an upper by sticking or sewing (if necessary also over an intermediate sole and an inner sole).

The essential properties required generally of a shoe, in particular a skiing, mountaineering or industrial shoe, are that it is watertight, resistant to cutting (e.g. with the skiing shoe because of the steel edges), light and capable of retaining its shape. The known skiing shoes referred to above does in fact possess an acceptable shape-retention due to its rubber layers of varying stiffness. The water-tightness is however, not so much dependent upon the material of the upper, but rather upon the joining of the upper with the outer sole. The resistance to cutting is not satisfactory at the outside in soft rubber mixtures and the shoe is heavy due to the many layers used.

SUMMARY OF THE INVENTION

The present invention relates to shoes, particularly skiing, mountaineering or industrial shoes, and to processes for their manufacture.

In accordance with the invention, there is provided a shoe whose upper consists of one or more textile layers (possibly coated with rubber or plastics) and of a sole joined to the upper, the whole shoe being coated with a cohesive polyurethane layer which has substantially the same thickness over the whole of the outside of the shoe.

Due to this uniform coating, absolute water-tightness is guaranteed even at the position of junction of the sole with the upper, polyurethane can, as is well known, be arranged to be tough and then possesses not only a high shape-retention but also a high resistance to cutting. Finally, by the use of the polyurethane coating, the shoe can be manufactured from only one, or at the most two, textile layers coated, if necessary, with rubber or plastics and can thus have a surprisingly small weight for skiing, mountaineering and industrial shoes. Owing to the high shape-retention, the shoe is preferably provided internally with cushion inserts, which can also at the same time act as heat insulating layers, since the particularly light shoe consisting of a few layers is possibly not in itself sufficiently heat insulating. However, the passage of heat and the weight can also be still further reduced if the polyurethane layer is arranged to be porous. Where required and for certain fields of use, a plurality of layers of compact porous polyurethane can be applied, where necessary having varying porosity, hardness, toughness, etc.

The polyurethane can be applied to the manufactured shoe by injection moulding, spraying, dipping or painting. Various polyurethane mixtures can be used, adjusted to meet the requirements in regard to hardness, toughness, specific weight and cold-strength.

The invention further provides a process for the production of the shoe in accordance with the invention in which a inner lining of textile or synthetic leather type is pulled onto a last. If desired, provided at known positions with cushioning inserts and/or heat insulating layers, and finally coated by injection moulding, spraying, dipping, or painting, with a cohesive polyurethane layer having a substantially constant overall thickness.

In accordance with a preferred form of process in accordance with the invention, the last with the textile layers, cushioning inserts, insulating layers and the like, is introduced into a mould and polyurethane mixture which, if desired, will form a porous material, is poured over it. If a plurality of layers are to be applied, after the application of a first polyurethane layer, the last with the semi-manufactured shoe on it may be transferred to a second mould and a further polyurethane layer poured over the last in the second mould. In this way, it is also possible to coat individual parts only of the leg with a polyurethane coating of a predetermined porosity, but to coat other parts with a non-porous layer or a layer of different porosity.

In order to prevent the formation of air bubbles from the porous cushioning inserts where these are used during the application of the hot polyurethane, the cushioning material is preferably preheated and/or coated with skiver or synthetic leather.

Having thus described the invention, what we claim as new and desire to be secured by Letters Patent is as follows:

1. A shoe, in particular a ski, mountaineering, industrial or like shoe comprising an upper consisting of at least one textile layer, and a sole joined to said upper, the entire shoe being coated externally throughout with a cohesive polyurethane layer which has a substantially constant overall thickness.

2. A shoe as claimed in claim 1, wherein at least a part of said polyurethane layer is porous.

3. A shoe as claimed in claim 1, wherein said polyurethane layer consists of a plurality of layers of varying hardness and toughness.

References Cited

UNITED STATES PATENTS

| | | | |
|---|---|---|---|
| 2,721,811 | 10/1955 | Dacey et al. | 36—9X |
| 3,052,046 | 9/1962 | Kramer | 36—9 |
| 3,228,122 | 1/1966 | Ludwig | 36—2.5 |
| 3,405,463 | 10/1968 | Werner | 36—2.5 |
| 3,116,501 | 1/1964 | Markevitch | 12—142 |
| 3,217,345 | 11/1965 | Snitzer | 12—142 |
| 3,370,363 | 2/1968 | Kaplan | 36—9 |

PATRICK D. LAWSON, Primary Examiner